United States Patent
Petersén

[19]

[11] Patent Number: 5,999,527
[45] Date of Patent: Dec. 7, 1999

[54] MODULAR SWITCH

[75] Inventor: Lars-Görab Petersén, Tumba, Sweden

[73] Assignee: Telefonaktiebolaget LM Ericsson, Stockholm, Sweden

[21] Appl. No.: 09/127,154

[22] Filed: Jul. 31, 1998

Related U.S. Application Data

[63] Continuation of application No. PCT/SE97/00144, Jan. 30, 1997.

[30] Foreign Application Priority Data

Feb. 2, 1996 [SE] Sweden .................................. 9600388

[51] Int. Cl.$^6$ ................................................... H04Q 11/04
[52] U.S. Cl. .......................... 370/360; 370/386; 370/395; 340/825.79
[58] Field of Search ..................................... 370/352, 359, 370/360, 376, 386, 395, 399, 413, 428; 340/825.79

[56] References Cited

U.S. PATENT DOCUMENTS

| | | | |
|---|---|---|---|
| 5,367,520 | 11/1994 | Cordell | 370/60 |
| 5,467,347 | 11/1995 | Petersen | 370/399 |
| 5,497,363 | 3/1996 | Gingell | 370/376 |
| 5,768,270 | 6/1998 | Ha-Duong | 370/395 |
| 5,844,887 | 12/1998 | Oren et al. | 370/395 |

FOREIGN PATENT DOCUMENTS 6-121353  4/1994  Japan .............................. H04Q 3/52

OTHER PUBLICATIONS

IBM Technical Disclosure Bulletin, "First–In First–Out Queuing in Single Stage Switching Networks Built from Multiple Identical Packet Switching Modules", Nov. 1993, vol. 36, No. 11, pp. 517–520.

*Primary Examiner*—Douglas W. Olms
*Assistant Examiner*—Shick Hom
*Attorney, Agent, or Firm*—Burns, Doane, Swecker & Mathis, L.L.P.

[57] ABSTRACT

A switch for high rate transfer of data and/or telecommunications includes several switchport devices for traffic cells and a switchcore device connected to the switchport device for routing the traffic cells inside from one switchport device to another. The switchport devices are provided in several groups. The switchcore device is formed by several switchcore units provided in rows and columns in a matrix. Each switchcore unit has at least as many inputs and outputs as there are switchport devices in a group of switchport devices. The switchcore units in each row have their inputs connected to the switchport devices in an individual group. The switchcore units in each column have their outputs connected to the switchport devices in the group of switchport devices having the same order as the order of the column in the matrix.

9 Claims, 3 Drawing Sheets

MODULAR SWITCH

This application is a continuation of International Application No. PCT/SE97/00144, which was filed on Jan. 30, 1997, which designated the United States, and which is expressly incorporated herein by reference.

This invention is directed to a large ATM-switch (ATM=Asynchronous Transfer Mode), which is able to transfer data and telecommunications at a rate up to 80 Gbps or even more as technology evolves.

BACKGROUND

In the future, the most common transfer mode for the broadband ISDN will be the ATM (Asynchronous Transfer Mode). ATM is a statistical multiplexing and switching method which is based on fast packet switching concept allowing an asynchronous operation between the sender clock and the receiver clock. The difference between the clocks is solved by providing temporary storage for input packages and by inserting or removing packets not containing useful information, i.e. emptying of assigned packets of data, in the information stream. ATM provides dedicated circuits for voice, data and video communications by dividing the information flow within each of these three types of traffic into individual traffic "cells", each being a kind of "package" including a header comprising an address or directions specifying the location to which the information carried within the cell should be delivered, and data about the information. Direction instructions are added to the information carried by the cell in the form of a label, which is processed by an ATM switch as the cell is routed through it.

A network having this kind of transfer mode is capable of transferring all sorts of services, for example low speed transfer, such as telemetry, telecontrol low speed data etc, medium speed transfer, such as hifi sound, video telephony etc, and high speed transfer, such as high quality video distribution or the like. Traffic cells are sent in a continuous data stream; traffic cells not containing useful information are inserted and/or removed in the datastream when necessary. No handshaking operations are provided in the network; instead the network has a low BER (Bit Error Rate). Nowadays, the concepts for telecommunications allow large Gigabit ATM switches to be designed based on a strictly non-blocking matrix. The matrix has then been simply increased to the desired size, by interconnecting switchcore chips. A 40 Gbps switch can most likely be made by using the proven technology of today.

However, as the volume of communication traffic increases, and particularly the demand for interaction between a customer and for instance the public data net INTERNET, demand has arisen for switches able to manage even higher rates.

According to the ATM principle a number of incoming links transport the ATM information to the ATM switch where depending on the value of the header of the incoming traffic cell the information is switched to an outgoing link. The incoming header and the incoming link number of the traffic cell are used to access a translation table in a switchcore. The result of the access to the translation table is an outgoing link and a new header value for the cell.

In a prior multiport controlled access ATM switch described in the U.S. Pat. No. 5,467,347 a multiport device included one switchcore circuit to which the ports were connected. This switchcore circuit was able to serve a number of A external links, where A for example is 16, up to a rate of 40 Gbps. There could be different inports and outports, or each port could be used as a combined input/output port.

However, nowadays there is a demand to be able to serve up to 128 links for rates up to and above 80 Gbps.

IBM Technical Disclosure Bulletin, Vol. 36, No. 11, November, 1993, (Armonk, N.Y., USA), "First-in First-out Queuing in Single Stage Switching Networks Built from Multiple Identical Packet Switching Modules", p. 517–520, discloses briefly on page 517 a modular switch structure, in which the modules can be constructed of small modules and when needed be combined to a matrix of four modules. At paralleled outputs there is provided a control logic which ensures that only one port is active at the time.

SUMMARY

An object of the invention is to provide an ATM-switch being able to serve more than 120 links for rates up to and above 80 Gbps.

Another object of the invention is to provide an ATM-switch adaptable to an actual number of lines and being able to be extended when the need arises.

Still another object of the invention is to provide an ATM-switch connectable in modules.

Yet another object of the invention is to provide an ATM-switch able to be modularly connectable in subracks being extendable to a desired extent.

According to the invention an extended switchcore module is formed by interconnecting several common kinds of switchcore modules in a squared way.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION

According to the invention, an extended switchcore module can be formed by interconnecting several switchcore units in a squared way, if strictly non-blocking properties are required.

Figure 1:
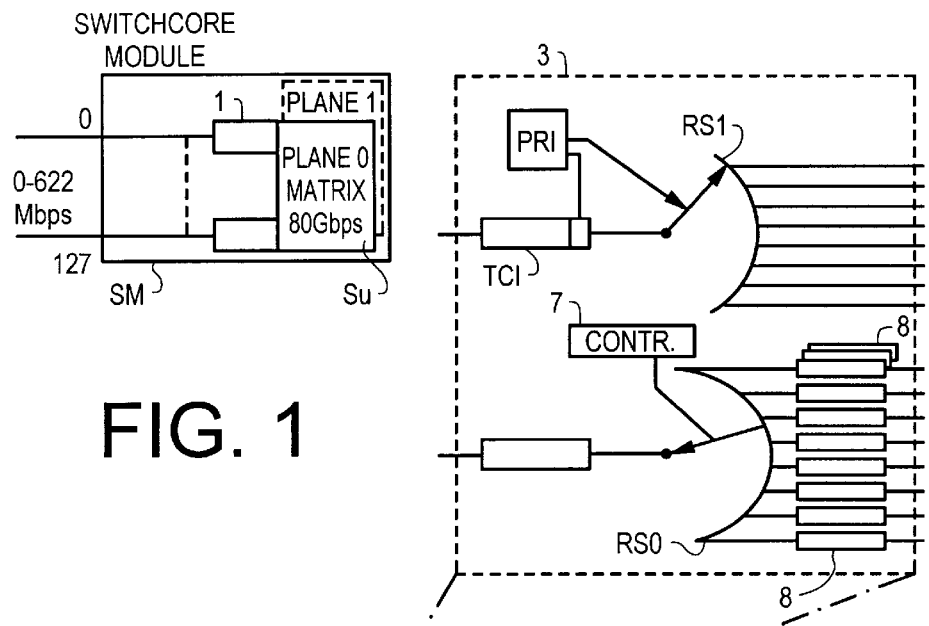
FIG. 1 shows a block diagram of a basic switch architecture of a first embodiment of the invention.

FIG. 1 illustrates schematically a switchcore unit SM having a number of 128 outputs/inputs from switchport units 1, numbered 0 to 127. It is to be noted that the given number only is exemplifying. These units are connected to a squared matrix SU of switchcore units. Two matrix planes, plane 0 and plane 1, are shown, of which plane 0 is the plane ordinarily used and plane 1 is a redundant plane, which in some applications could be omitted.

Figure 2:
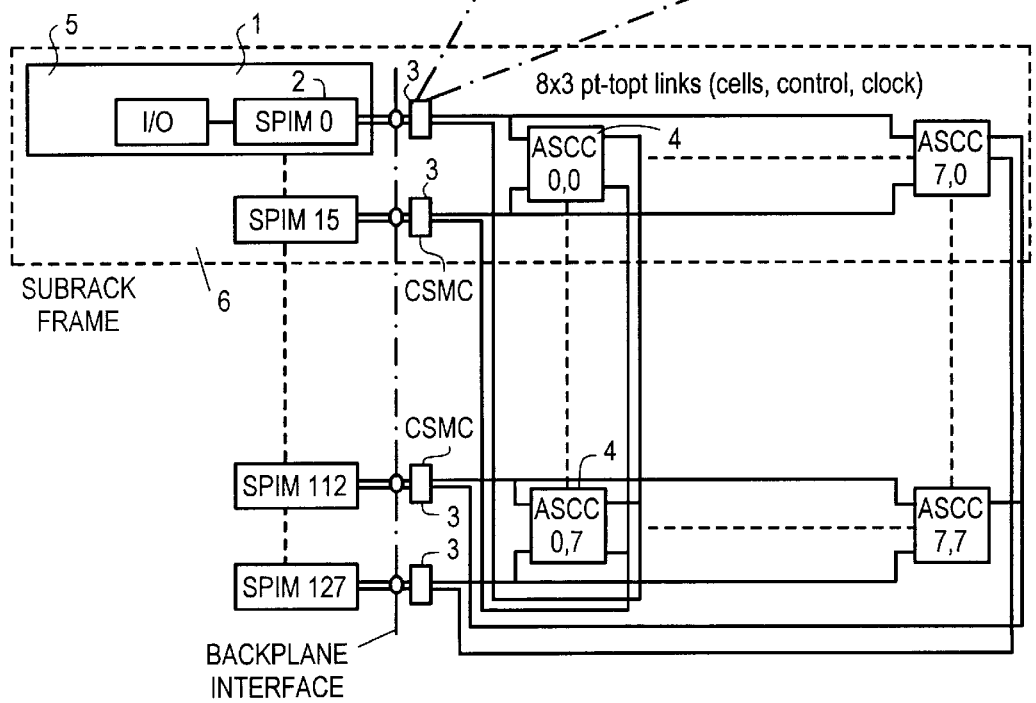
FIG. 2 shows a block diagram of a second embodiment of the switch according to the invention.

FIG. 2 illustrates schematically a more detailed version of the switchcore module in FIG. 1. Each switchcore unit in the matrix is able to handle a number A of switchport devices 1 each comprising a switchport 2, a line input/output unit I/O connected to the switchport 2 for the traffic cells to be transferred and routed through the switch, and also buffer means (not shown) at its inlet side. The switchports 2 in the switchport devices 1 are exemplified to be of the SPIM (SPIM=SwitchPort Interface Module) kind, as apparent from the text in the switchport blocks 2. A is illustrated to be 16 (e.g. SPIM 0 to SPIM 15) but that number is only exemplifying.

The ports to the extended switchcore module are thus divided into a number of groups, each group comprising a number of A switchport devices 1. According to the invention several switchcore units 4 in a square matrix cooperate to form an extended switchcore.

The switchcore units 4 in each row of switchcore units 4 have their inputs connected in parallel to the input side of the switchports 2 in an individual group of switchports. The switchcore units in the embodiment in FIG. 1 are illustrated as being of the ASCC (Amax Switchcore Circuit) kind as apparent from the text in the blocks. Such a kind of switchcore circuit is in itself formed in a matrix and is described in the U.S. Pat. No. 5,467,347 mentioned above and is hereby incorporated in the specification by reference herein. Thus "ASCC 0,0" to "ASCC 7,0" in the first row are connected to the ports 2 "SPIM 0" or to "SPIM 15" in the first group of switchports, and "ASCC 0,7" to "ASCC 7,7" in the last row are connected to the ports 2 "SPIM 113" to "SPIM 127" in FIG. 1.

Several switchport/switchcore units are then provided in a column in relation to each other. Thus, each row of switchcore units 4 comprises the number of A switchcore units 1 and is called a frame 6. There are a number of B frames 6 having the same design, where B=8 in the illustrated embodiment.

In the matrix, the outputs of the switchcore units 4 in the different frames are interconnected, such that the outputs of the first switchcore unit 4, "ASCC 0,0" to "ASCC 0,7", in all the frames are interconnected and connected to the switchports 2 in the first group, the outputs of the second switchcore unit in all the frames are interconnected and connected to the switchports in the second group, . . . and the outputs of the last column of switchcore units 4 are connected to the switchports 2 in the last frame.

When only one switchcore unit was provided in an ATM-switch, as in earlier applications, it was connected directly to the switchports.

Since there are several groups of switchports, this means that inputs from one group should be able to be routed through ports belonging to another group.

Therefore, a combined split/merge circuit 3, below called CSMC is connected to the output/input of each switchport 2 turned towards and providing an interface to the switchcore matrix. The purpose of the combined split/merge circuits 3 is to reduce interconnections between the device boards and the backplanes.

As seen in the upper part of FIG. 2, where a CSMC is shown in an enlarged view, each CSMC comprises a physical route identifier PRI being able to read the header of each traffic cell TCI to be transmitted through the switchcore unit in order to read its destination within the switch, i.e. to which switchcore unit in the row of the switchcore unit matrix adapted to the SPIM into which the cell is entered and the address in this switchcore unit, and it also identifies the source switchport when the traffic cell has passed the switchcore unit matrix. Naturally, a buffer for several traffic cells to be routed could be provided also at the input to the RSI (not shown) as in all places where the traffic cells could be stored temporarily for checking, control and/or processing in the switchcore module.

Since the switchcore unit matrix, "ASCC 0,0" to "ASCC 7,7", is expanded compared to the switchcore circuit used in earlier switchcore devices additional routing information in the traffic cell is needed. This information could be provided in additional control cells of 4 bytes in each traffic cell, if a switchcore unit matrix of 8 by 8 switchcore units is provided.

Each CSMC 3 comprises an input route switch RSI for the incoming cells from the SPIM and an output route switch RSO for the cells to be outputed through the SPIM. These route switches are illustrated as mechanical route switches in FIG. 2. However, it is to be noted that they preferably are built by electronic circuitry according to the techniques common nowadays. The person skilled in the art is well acquainted with this kind of circuitry. Therefore, no embodiment of such circuitry is shown and described.

The input route switch RSI has as many positions as there are switchcore units in a row, i.e. eight in the embodiment in FIG. 2. Each position comprises at least three lines (not illustrated in FIG. 2 for clarity reasons), one for the traffic cell data, one for the clock signal and one for control of the switchcore unit 4 to which the traffic cell is routed. The routing information is provided in the header of the traffic cell and is used for setting the input route switch RSI to direct the traffic cell to the correct switchcore unit in the subrack frame belonging to the port in question. Control is also provided to route the traffic cell to the appropriate position in that switchcore unit where it is stored temporarily.

The header value of the traffic cell is then changed. The traffic cell is routed to stores 8 connected to the multipole input side of the switch RSO in the CSMC cooperating with the output port for the traffic cell in question. Thus the routing of the traffic cells to their allotted output ports is determined by the switchcore unit it is directed to from its input SPIM and thus by the column of the switchcore unit 4 in the row connected to that SPIM it is directed to.

In the embodiment according to FIG. 2, each "SPIM" includes at least one buffer store at each input position of the output routing switch for the temporary storage of traffic cells to be outputed on the line connected to it. The output from each CSMC through the "SPIM" must be provided at the right time and the inevitable delay of a traffic cell when transmitted from its switchcore unit to the CSMC is taken care of by storing it temporarily in the temporary stores 8 before it is read out from the store at the right time adapted to the output line. It is convenient to let each store 8 comprise several buffer stores, as illustrated for the upper store 8 in the array of stores. The rest of the stores are shown without extra buffer stores for clarity reasons. The traffic cells could be queued up after each other and/or they could be stored in different storage planes dependent upon priority marks in the heads of the traffic cells.

A control device 7 controls the storage of the traffic lines, controls the priority of when stored traffic cell will be presented to the line according to predetermined conditions, and inserts extra traffic cells not containing useful information in the output data stream when needed. The control 7 could for instance make a snapshot scanning of the stores 8 before each cycle of transmitting the contents of the stores to the "SPIM". All the front traffic cells on place at the snapshot are served from top to bottom before a new snapshot is taken. In this way traffic cells coming into a store 8 after a snapshot is delayed to next cycle in order to provide an approximate fair sequential output order for the traffic cells to be transmitted from the switchcore module. This is the best mode of application.

It is also possible to control the switchcore units to store their traffic cells to be routed to the output ports until they are controlled from the output routing switch to feed cells to the switch, i.e. to have a backpressure in the system. A message flag is then sent to the "SPIM" output switch in question as soon as a switchcore unit has been fed with a traffic cell to be routed through the "SPIM" output. When the traffic cell stored in the switchcore unit is in turn to be presented to the output line the control device 5 causes the output routing switch RSO to be set in the right position and also causes the switchcore unit to feed the traffic cell to the switch RSO through the control line to that switchcore unit.

A backpressure could also be provided from each switchcore unit 4 to the RSI it is connected to, and the RSI could in turn provide a backpressure to the switchport unit.

Figure 3:
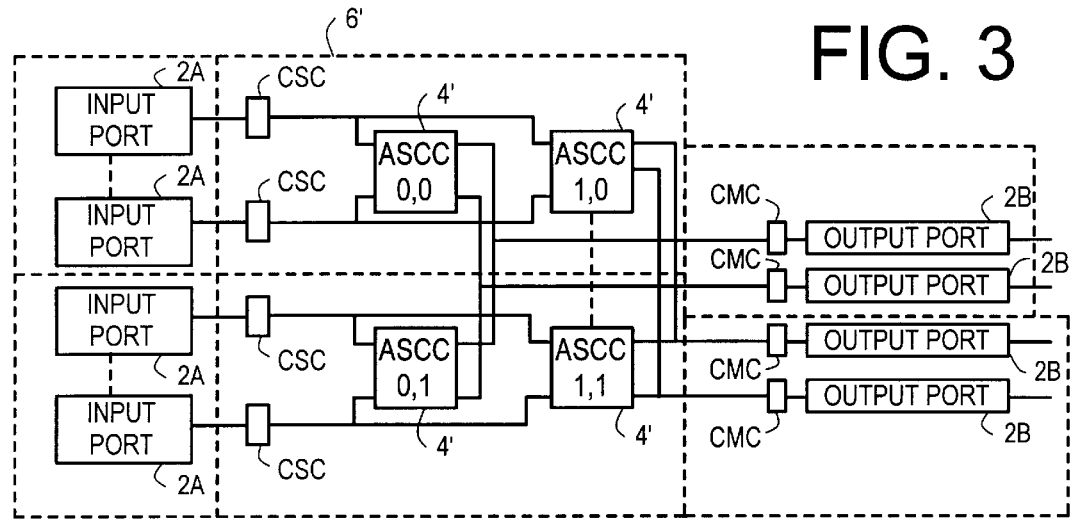
FIG. 3 illustrates a first embodiment of a rack comprising the switch architecture according to the invention.

The same units have been used as input ports and output ports 4 in the embodiment in FIG. 2. FIG. 3 shows an embodiment having different input ports 2A and output ports 2B. It also illustrates a switchcore module having only 2 by 2 switchcore units 4'. The main difference in relation to FIG. 2 is that in FIG. 3 the CSMC is split up into a split circuit CSC between each input switchport 2A and inputs of switchcores in the row of the switchcore matrix belonging to the input port group, and a merge circuit CMC between each output switchport 2B and the outputs of the column of switchcore units belonging to the group of output ports to which the output port belongs. The circuit CSC has preferably the same configuration as the upper system having the routing switch RSI in the CSMC 3 in FIG. 2. The circuit CMC has preferably the same configuration as the lower system having the routing switch RSO in the CSMC 3 in FIG. 2. It is to be noted that it is possible to have different numbers of input ports 2A and output ports 2B, so that a step-up or a step-down regarding the number of lines to and from the switchcore module could be provided.

In the way common for the inventive kind of switch, each switchport device including an input/output means I/O and a switchport 2 is preferably provided on an individual device board 5 (see FIG. 2).

Figure 4:
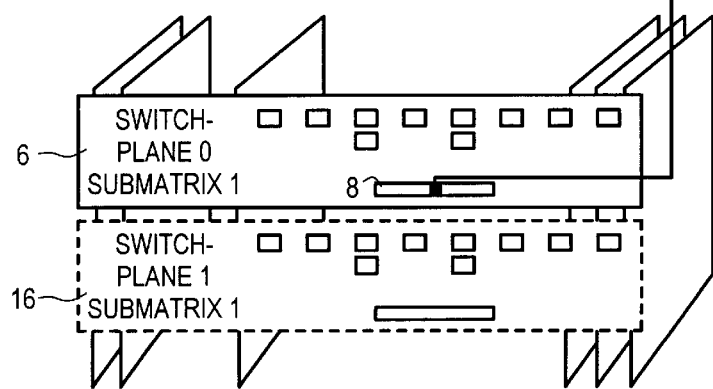
FIG. 4 illustrates a second embodiment of a rack comprising the switch architecture according to the invention.

An embodiment of a rack of a basic switch architecture for the switch according to the invention having a matrix of 2 by 2 switchcore units 4 is shown in FIG. 4. The same references are used as in FIG. 2 for the same kind of elements even though the matrix is smaller in FIG. 4. Each subrack frame 6 has preferably a redundant counterpart 16 as is common in this technical area. The redundant circuitry is used when the ordinary circuitry needs repair or the like.

FIG. 2 shows the interconnection architecture for a switchplane in the switchcore module. Each switchport interfaces through a backplane interface (shown by a dash-dotted line) to the combined split/merge circuit 3.

In FIG. 4 it is illustrated that each device board 5 includes a switchport. The switchboard 5 is plugged in to a connecter (not shown) provided at the back of a backplane 6. The CSMCs 3 and the switchcore units 4 are provided as integrated circuits mounted on a printed circuit printed on the backplane 6. The outputs of the switchcore units 4 in the different columns belonging to different frames are interconnected by connectors 8 and a multiconductor line 9.

Thus, in the embodiment shown in FIG. 4, each rack for a switchcore module comprises only two subracks (and two redundant modules). Each subrack has a throughput of for instance 10 Gbps and can hold up to sixteen device boards each comprising an I/O circuit and a SPIM and its control circuits for the routing function and a number of power boards 7 for supplying power to the subrack circuitry.

Figure 5:
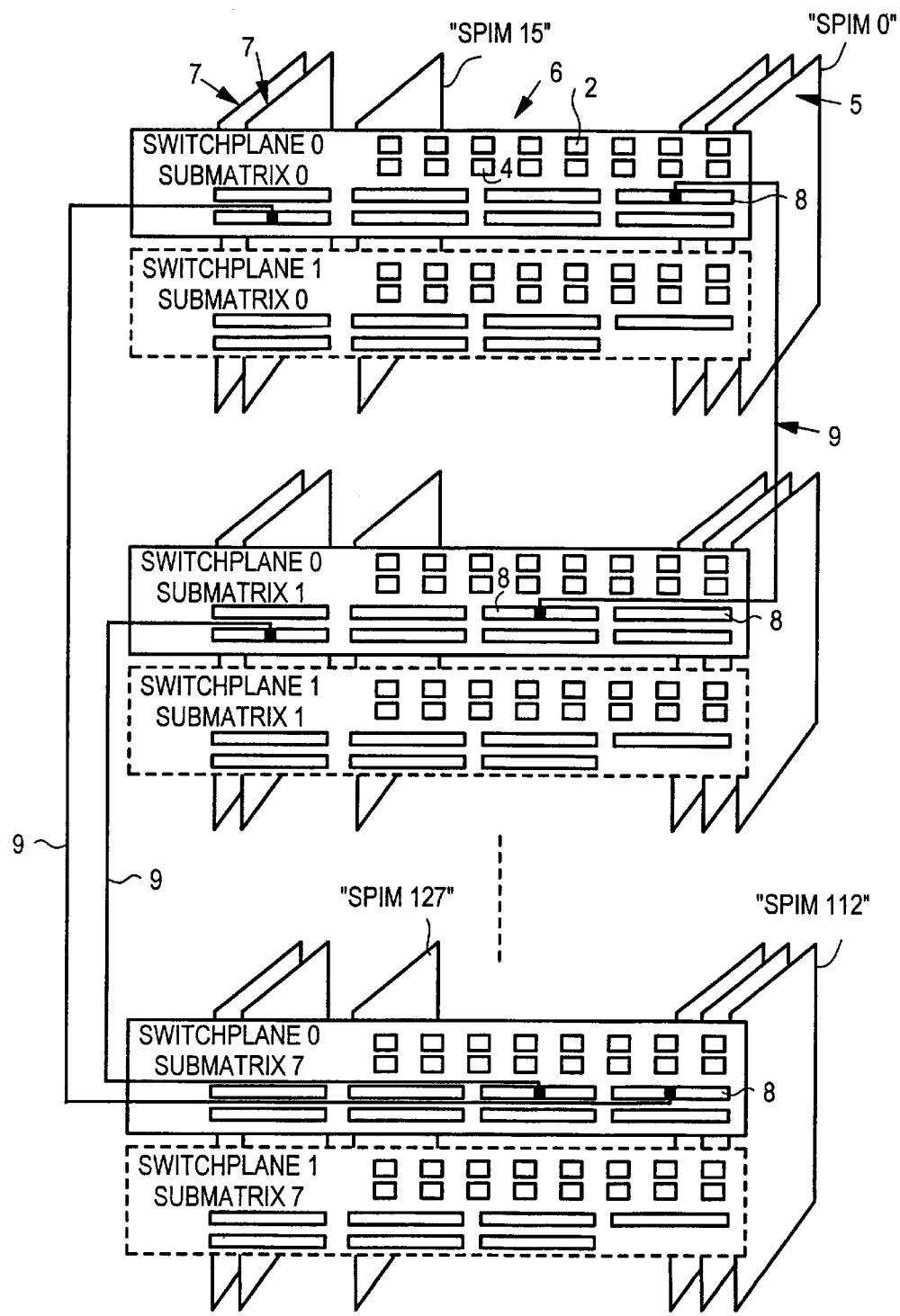
FIG. 5 illustrates an embodiment comprising a connection of some basic switch architectures according to the invention providing a further extended switch.

However, a larger switchcore module could be created by interconnecting up to eight subracks giving a throughput of 80 Gbps, as illustrated in FIG. 5. The rack in FIG. 5 corresponds to the circuitry shown in FIG. 2 with regard to the number of switchport groups and the switchcores in the switchcore matrix. Each backplane 6 comprises eight switchcores 4. There are seven connectors 8 for interconnecting the outputs of the switchcores in the different frames 6.

It is to be noted that the FIGS. 4 and 5 represent different stages of enlargements of the same type of backplane. The extra elements in FIG. 5 in relation to in FIG. 4 could be provided in empty IC-sockets and connector sockets already provided on the back of the backplane 6. The switch according to the invention could thus be easily expanded mounting extra subracks in a rack, by plugging in extra switchcore units 4 into empty IC-sockets, plugging in extra connectors in empty connector sockets and connecting the subracks with each other by the connectors 8 and multiconductor cables 9 in the way apparent from FIG. 5. A modular expansion of the switch according to the invention is thus easy to provide.

For instance, each module can terminate up to C external links, each being able to carry 0–D Mbps, where for example C=128 and D=622, as apparent on the left side of each module. It is to be noted that the figures given are only examplifying and are not to be regarded as limiting in any aspect. The figures are based on what seems feasible with available technology nowaday.

The switch according to the invention can be further extended by combining several switches of the kind shown in FIG. 2. Two switchcore modules can be used for load-sharing.

Each access module can serve as multiplexer, concentrator and/or switch. Access modules can also be cascaded for instance if it is a requirement to connect for instance a number $>2^{14}$ of low rate external links.

What I claim is:

1. A switch for high rate transfer of data/or telecommunications comprising several input and output switchport means for traffic cells provided in several groups;

several switchcore modules, each comprising a switch core matrix, provided in a matrix arranged in rows and columns forming a switchcore means connected to the switchport means for routing the traffic cells inside the switchport means from one switchport means to another, the switchcore modules in each row having their inputs connected to an individual group of input switchport means for the row in question the switchcore modules in each column having their outputs connected to an individual group of the output switchport means for the column in question; and input route switch means (RSI) connected between each input switchport means and its row in the matrix of switchcore modules for routing an incoming traffic cell to a particular switchcore module in the row having an output directed to the group of output switchport means including the output stated for the traffic cell in question.

2. The switch according to claim 1, wherein an output route switch means is connected between each output switchport means and the matrix of switchcore modules for routing an outgoing traffic cell from a particular switchcore module in the column of switchcore modules having its outputs connected to the switchport means.

3. The switch according to claim 1 wherein the input and/or output switchport means is a combined switchport means for input and output of traffic cells.

4. The switch according to claim 1, further comprising separate input and output switchport means for input and output of traffic cells.

5. The switch according to claim 1, wherein each switchcore module has as many inputs and outputs as there are switchport means in the group or groups of switchport means to which it is connected.

6. The switch according to claim 1, wherein said switchcore modules are provided as circuits mounted on backplane means.

7. The switch according to claim 5, wherein said switchport means is provided on device board means connectable to a backplane means.

8. The switch according to claim 1, wherein each group of switchport means and the row of switchcore units having their inputs connected thereto are provided in an individual subrack in a rack.

9. The switch according to claim 8, wherein connecting means connects the switchcore modules column by column in the different subracks in the rack.

* * * * *